(12) United States Patent
Kroeger et al.

(10) Patent No.: US 7,454,614 B2
(45) Date of Patent: Nov. 18, 2008

(54) METHOD AND APPARATUS FOR FAULT TOLERANT TCP HANDSHAKING

(75) Inventors: Thomas Kroeger, Santa Cruz, CA (US); David Kashtan, La Selva Beach, CA (US); Adam Cain, Madison, WI (US); Craig Watkins, State College, PA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 10/103,774

(22) Filed: Mar. 25, 2002

(65) Prior Publication Data

US 2002/0157037 A1 Oct. 24, 2002

Related U.S. Application Data

(60) Provisional application No. 60/279,440, filed on Mar. 29, 2001.

(51) Int. Cl.
*H04L 9/00* (2006.01)
*G06F 11/07* (2006.01)

(52) U.S. Cl. .................. 713/168; 713/150; 714/2; 714/3; 714/4; 714/15; 726/22; 726/26

(58) Field of Classification Search ............... 713/153, 713/163, 201, 150, 160, 168, 170, 181; 714/1–4, 714/13, 25, 15, 100; 709/227, 228, 223–225; 370/230, 241, 242; 380/247; 726/22, 26
See application file for complete search history.

(56) References Cited

U.S. PATENT DOCUMENTS

| | | | | |
|---|---|---|---|---|
| 5,369,705 A * | 11/1994 | Bird et al. ................ 713/163 |
| 5,430,709 A * | 7/1995 | Galloway ................ 370/241 |
| 5,517,567 A * | 5/1996 | Epstein .................. 380/247 |
| 5,905,860 A * | 5/1999 | Olsen et al. .............. 713/201 |
| 5,958,053 A * | 9/1999 | Denker .................. 713/201 |
| 6,134,327 A | 10/2000 | Van Oorschot |
| 6,148,410 A * | 11/2000 | Baskey et al. ............... 714/4 |
| 6,195,680 B1 * | 2/2001 | Goldszmidt et al. ......... 709/203 |
| 6,247,141 B1 * | 6/2001 | Holmberg .................. 714/2 |
| 6,256,740 B1 * | 7/2001 | Muller et al. .............. 726/12 |
| 6,463,533 B1 * | 10/2002 | Calamera et al. .......... 713/163 |
| 6,671,821 B1 * | 12/2003 | Castro et al. ................. 714/4 |

(Continued)

OTHER PUBLICATIONS

D. J. Bernstein, "SYN Cookies", http//cr.yp.to/syncookies.html, Mar. 4, 2002, pp. 1-3.

*Primary Examiner*—Kristine Kincaid
*Assistant Examiner*—Yin-Chen Shaw
(74) *Attorney, Agent, or Firm*—Banner & Witcoff, Ltd.

(57) ABSTRACT

Method and apparatus for fault tolerant TCP handshaking that includes a first node and a second node both connected in a network where the second node is one of at least two nodes in a cluster of nodes. The second node receives a first message from the first node where the first message includes a sequence number. The second node generates a fingerprint and replaces a portion of the sequence number with the fingerprint to form a cryptographic sequence number. The cryptographic sequence number is sent from the second node to the first node. A second message that includes the cryptographic sequence number is received from the first node at the second node. Any node in the cluster can verify that the cryptographic sequence number sent by the first node was created by one of the nodes in the cluster thereby providing fault tolerant TCP handshaking.

19 Claims, 3 Drawing Sheets

U.S. PATENT DOCUMENTS

| | | | |
|---|---|---|---|
| 6,686,222 B2 * | 2/2004 | Omizo et al. | 438/107 |
| 6,772,334 B1 * | 8/2004 | Glawitsch | 713/153 |
| 6,772,337 B1 * | 8/2004 | Yener | 713/165 |
| 6,941,366 B2 * | 9/2005 | Antes et al. | 709/224 |
| 7,240,202 B1 * | 7/2007 | Orman | 713/169 |
| 2002/0087912 A1 * | 7/2002 | Kashyap | 714/13 |

* cited by examiner

METHOD AND APPARATUS FOR FAULT TOLERANT TCP HANDSHAKING

This application claims the benefit of U.S. Provisional Patent Application No. 60/279,440, filed Mar. 29, 2001, the contents of which is incorporated by reference herein in its entirety.

BACKGROUND

1. Field of the Invention

This invention relates to Transmission Control Protocol (TCP), and more specifically to fault tolerant TCP handshaking.

2. Background Information

Many networks consist of a number of client machines and server machines interconnected through the network. Generally, clients make requests to servers for information across the network. The server responds by supplying the information to the client. Transmission control protocol (TCP) is a networking protocol that provides communication across interconnected networks between computing devices such as client machines and server machines. An initial exchange, known as handshaking, between a client and a server occurs prior to data transmission to ensure proper data transmission.

Moreover, a collection or group of network nodes interconnected together called a cluster may reside on the network. The cluster may process traffic between a client and server. Clustering increases the effectiveness and efficiency of security, administration and performance, and helps servers become fault resilient. All nodes in a cluster have external interfaces on one wire and their internal interfaces on another wire. The entire cluster behaves as if it were a single piece of hardware. Each cluster member listens on the external cluster address, therefore, seeing every packet addressed to the cluster.

FIG. 1 shows a block diagram of a network containing a first network node connected to a cluster of network nodes. Network node 10, i.e., client machine, may be connected to a cluster 20 via network 12. Cluster 20 may consist of two or more network nodes 22-28. Network nodes 22-28 have internal connections 14 as well as external connections 16 to the network 12. Cluster 20 may transfer traffic between a client network node 10 and a server node (not shown).

A cluster member may be operating in one of two states, a working resources state or a mirror state. If a member is handling a given TCP connection, the member may have various working resources allocated to it, e.g., sockets, memory buffers, etc. However, since any other member must be prepared to take over for that member at any given time, the other members must possess a mirrored state. A mirrored state is a passive state sufficient to recreate the working resources in order to handle the workload or TCP connection of another member. Only the minimal amount of state to allow other members to reproduce the original state upon fail over may be sent to each member in the cluster. Further, each individual member may not need to be configured with all state information. Once a member is configured as part of the cluster, state information and other configuration information may be propagated automatically.

In current systems, a problem occurs if the start of a TCP handshake is clustered. When this occurs, the entire cluster is made highly vulnerable to a SYN denial of service attack. This occurs when some attacker simply floods a targeted machine in a cluster with many bogus SYNs with source addresses that are randomly generated. If the fact that the targeted machine just received a SYN is clustered, too much memory is taken up for each individual SYN, and an attacker could cripple the cluster with a SYN flood.

During a typical TCP handshake, a client chooses a sequence number randomly and sends a SYN message with the sequence number to the destination (i.e., cluster). The cluster receives the SYN, picks a random sequence number and sends a SYN/ACK with this number back to the client. The client then acknowledges (ACKs) the cluster's sequence number.

However, a problem occurs if the node in the cluster handling the connection fails after it has sent the SYN/ACK. Then, a client may think that it has an open connection, but none of the members of the cluster know that this connection exists since this connection is starting and hasn't been clustered. The data during the cluster receipt of the SYN is not clustered as noted previously since an attacker could flood a cluster with random SYNs and cause the node in the cluster to exhaust all memory for bogus connections.

Therefore a need exists for methods and apparatus that handle situations when a node in a cluster fails during an initial TCP handshake.

SUMMARY OF THE INVENTION

The present invention is directed to a method for fault tolerant TCP handshaking that includes: receiving a first message from a first node in a network at a second node in the network, where the second node is one of two or more nodes in a cluster of nodes, and where the first message includes a sequence number; generating a fingerprint; replacing a portion of the sequence number with the fingerprint to form a cryptographic sequence number; sending the cryptographic sequence number from the second node to the first node; and receiving a second message from the first node at the second node, where the second message includes the cryptographic sequence number. Any node in the cluster can verify that the cryptographic sequence number sent by the first node was created by one of the nodes in the cluster thereby providing fault tolerant TCP handshaking.

The present invention is also directed to a system for fault tolerant TCP handshaking that includes a first node and a second node both operably connected to a network. The second node is one of two or more nodes in a cluster of nodes operatively connected to the network. The second node: receives a first message from the first node that includes a sequence number, generates a fingerprint, replaces a portion of the sequence number with the fingerprint to form a cryptographic sequence number, and sends the cryptographic sequence number from the second node to the first node. A second message including the cryptographic sequence number may be received at the second node from the first node. Any node in the cluster is capable of verifying that the cryptographic sequence number sent by the first node was created by one of the nodes in the cluster thereby providing fault tolerant TCP handshaking.

Moreover, the present invention is further directed to an apparatus comprising a storage medium with instructions stored therein. The instructions when executed cause a computing device to perform: receiving a first message from a node in a network, where the first message includes a sequence number; generating a fingerprint; replacing a portion of the sequence number with the fingerprint to form a cryptographic sequence number; sending the cryptographic sequence number to the node; and receiving a second message from the node, where the second message includes the cryptographic sequence number. The cryptographic sequence number may be verified as having been created by one of two or more nodes in a cluster thereby providing fault tolerant TCP handshaking.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
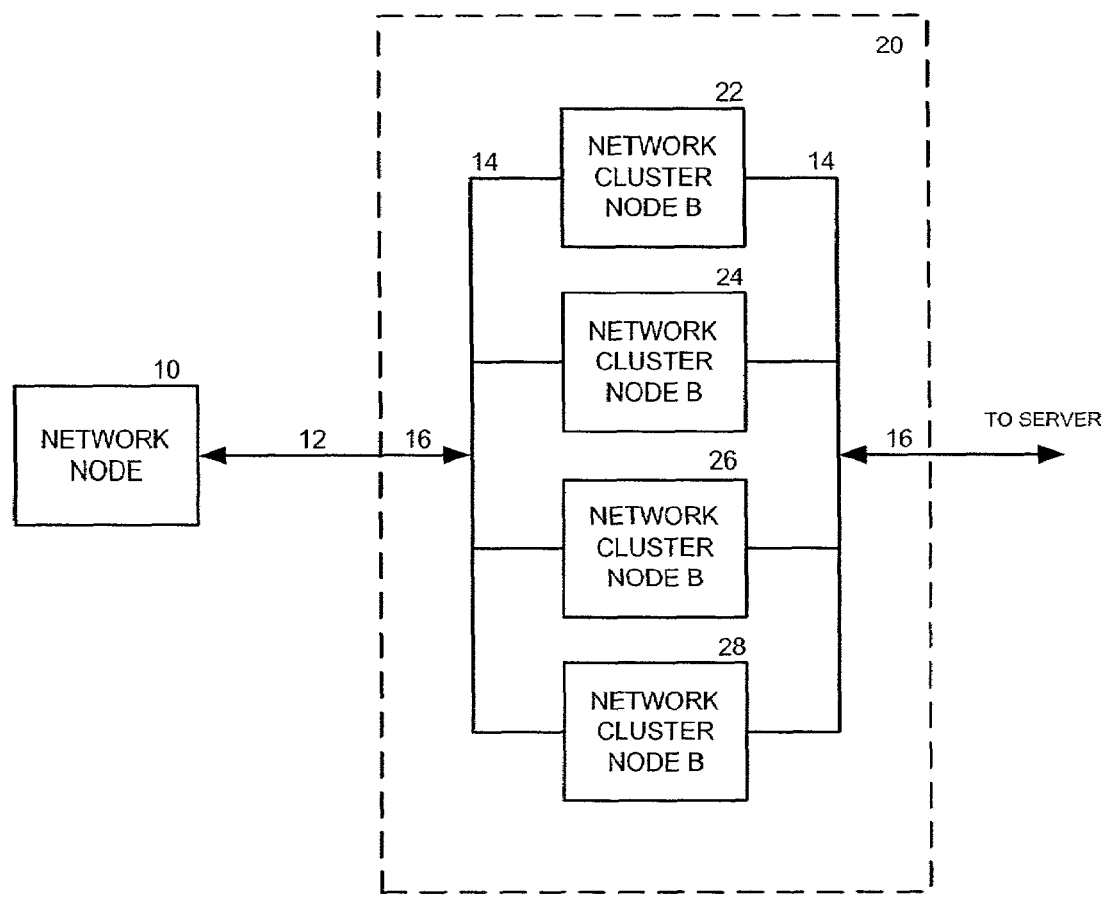
FIG. 1 is a block diagram of a network containing a first network node connected to a cluster of network nodes.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to method and apparatus for fault tolerant TCP handshaking where fingerprinted TCP acknowledgments (ACKs) are used to solve the problem of node failure during an initial TCP handshake. With fingerprinted ACKs, a sequence number with a cryptographic fingerprint (cryptographic sequence number) is generated by a node in a cluster so that any member of the cluster may verify that a sequence number received and acknowledged by the cluster is one that a member in the cluster would have created.

A fingerprint may be a set of bits from a hash function of a source node's address, port, destination port, destination address, and a cluster wide shared secret. The hash function may be, for example, a 128 bit MD5 hash. The cluster wide shared secret may change periodically for added security, for example, every two minutes. Moreover, the result of the hash function may be mixed with some random bits to still keep some parts of the sequence number from the hash code in the generation of the fingerprint. In methods and apparatus according to the present invention, a fingerprint is added to a portion of or replaces the sequence number received from a source node (e.g., client machine).

As noted, a fingerprint may be a hash of the source IP address, source port, destination IP address, destination port, and current cluster secret. Bits 3-20 of this hash may then be used to replace bits 3-20 of a sequence number received from the source node. Bits 0-2 may be left unchanged to allow some randomness between TCP sequence numbers for a specific value of the cluster secret. The cluster secret may be a private key between all nodes in the cluster.

In methods and apparatus according to the present invention, if a cluster member receives a TCP ACK and fingerprinted acknowledgments is enabled, the TCP stack at the cluster node may check to see if that sequence number is correct. If so, then this cluster node uses that ACK to build an entire TCP connection and presumes that the connection is the source node's ACK with cryptographic sequence number of something a failed cluster node had started. Therefore, nodes in a cluster can verify that acknowledges received from clients contain a cryptographic sequence number that was created by a node at that cluster, thereby providing fault tolerant TCP handshaking where alien or hostile clients cannot bombard a cluster with bogus acknowledgments.

Figure 2:
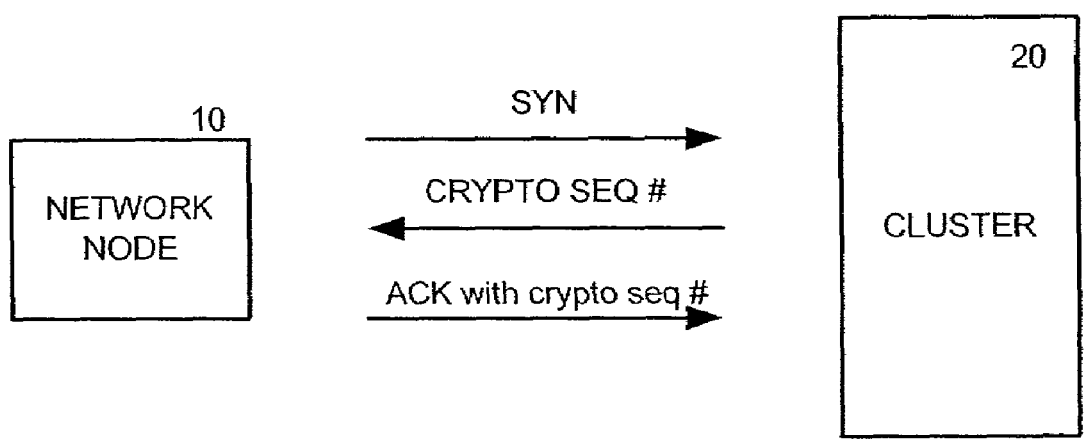
FIG. 2 is a block diagram of communication between a network node and a cluster according to an example embodiment of the present invention.

FIG. 2 shows a block diagram of communication between a network node and a cluster according to an example embodiment of the present invention. Network 10 communicates with network node 20 by initially sending a SYN message. A node in cluster 20 receives the SYN message from network node 10, generates a fingerprint and replaces the sequence number in the SYN message with a crypto sequence number and forwards this to network node 10. Network node 10 receives the crypto sequence number and inserts this in any acknowledgment sent from network node 10 to the cluster 20.

Figure 3:
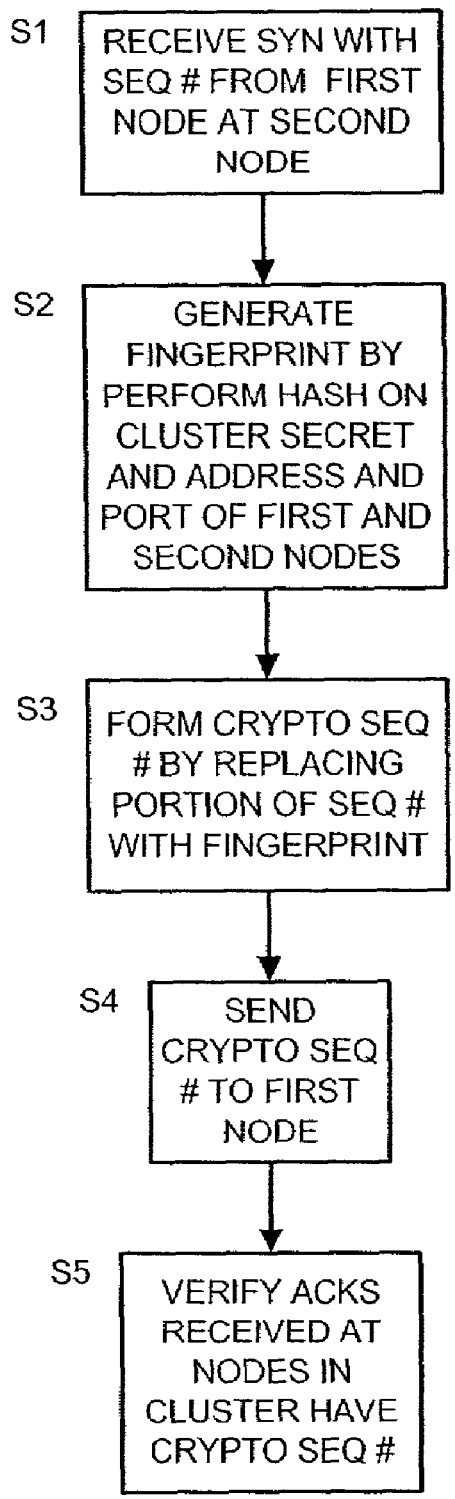
FIG. 3 is a flowchart for fault tolerant TCP handshaking according to an example embodiment of the present invention.

FIG. 3 shows a flowchart for fault tolerant TCP handshaking according to an example embodiment of the present invention. An SYN message with a sequence number is received from a first node at a second node S1. The second node is a member of a cluster of nodes. The second node generates a fingerprint by performing a hash function on a cluster secret, and address and port of the first and second nodes S2. A cryptographic sequence number is formulated at the second node by replacing a portion of the sequence number with the fingerprint S3. The cryptographic sequence number is sent from the second node to the first node S4. Any acknowledgments received at the nodes in the cluster are verified by determining if they have a cryptographic sequence number generated by one of the cluster nodes S5.

The present invention is advantageous in that an attacker may not simply flood a targeted machine with erroneous SYNs with source addresses that are randomly generated. Therefore, memory is not taken up due to the creation of connections from bogus acknowledgments.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method comprising:
receiving a message from a first node in a network at a second node in the network, the second node being one of at least two nodes in a cluster of nodes, the message including a cryptographic sequence number;
wherein the message was sent by the first node subsequent to an initial message sent by the first node to a third node, and an initial reply sent by the third node to the first node, the third node being in the cluster of nodes,
wherein each of the nodes in the cluster stores a cluster wide shared secret, wherein the cluster wide shared secret comprises a private key of the nodes in the cluster,
wherein the initial message sent by the first node includes a sequence number, and wherein the initial reply sent by the third node includes a cryptographic sequence number generated by the third node, the cryptographic sequence number generated by replacing a portion of the sequence number received in the initial message with a fingerprint based on the cluster wide shared secret stored at the third node, wherein the fingerprint is generated using an Internet Protocol (IP) address of the first node, a port of the first node, a port of the second node, an IP address of the second node, and the cluster wide shared secret;
processing the message at the second node to determine that the first node and the third node were involved in a connection setup procedure that has not yet been completed;
verifying at the second node that the cryptographic sequence number sent by the first node was created by one of the nodes in the cluster, wherein the verifying comprises accessing the cluster wide shared secret stored at the second node, and wherein either:
the second node builds a connection between the second node and the first node if the cryptographic sequence number was generated based on the cluster wide shared secret; and
the second node determines that the first node was not legitimately attempting to create a connection with the third node if the cryptographic sequence number was not generated based on the cluster wide shared secret.

2. The method according to claim 1, wherein the initial message comprises a SYN message.

3. The method according to claim 1, wherein the fingerprint is generated by performing a hash function on the IP address of the first node, the port of the first node, the port of the second node, the IP address of the second node, and the cluster wide shared secret.

4. The method according to claim 3, wherein the hash function comprises an MD5 hash.

5. The method according to claim 1, wherein the message comprises an Acknowledge message.

6. The method according to claim 1 further comprising changing the cluster wide shared secret at periodic intervals.

7. The method according to claim 6, further comprising changing the cluster wide shared secret every two minutes.

8. The method according to claim 3, wherein the fingerprint is generated using the result from the hash function mixed with some random bits.

9. A system comprising:
a first node, the first node operably connected to a network; and
a second node, the second node being one of at least two nodes in a cluster of nodes operably connected to the network, wherein each of the nodes in the cluster stores a cluster wide shared secret, wherein the cluster wide shared secret comprises a private key of the nodes in the cluster, the second node configured to receive an initial message that includes a sequence number from the first node, to generate a fingerprint based on the cluster wide shared secret stored at the second node, to replace a portion of the sequence number received from the first node with the fingerprint to form a cryptographic sequence number, and to send the cryptographic sequence number from the second node to the first node in an initial reply, wherein the second node generates the fingerprint using an Internet Protocol (IP) address of the first node, a port of the first node, a port of the second node, an IP address of the second node, and the cluster wide shared secret;
a third node, the third node being in the cluster of nodes operably connected to the network, the third node configured to receive a message including the cryptographic sequence number from the first node, to process the message to determine that the first node and the second node were involved in a connection setup procedure that has not yet been completed, and to verify that the cryptographic sequence number sent by the first node in the message was created by one of the nodes in the cluster, wherein the verifying comprises accessing the cluster wide shared secret stored at the third node, and wherein either:
the third node is configured to build a connection between the third node and the first node if the cryptographic sequence number was generated based on the cluster wide shared secret; and
the third node is configured to determine that the first node was not legitimately attempting to create a connection with the second node if the cryptographic sequence number was not generated based on the cluster wide shared secret.

10. The system according to claim 9, wherein the second node generates the fingerprint by performing a hash function on the IP address of the first node, the port of the first node, the port of the second node, the IP address of the second node, and the cluster wide shared secret.

11. An apparatus comprising a computing device configured to perform:
receiving a message from a first node in a network at a second node in the network, the second node being one of at least two nodes in a cluster of nodes, the message including a cryptographic sequence number;
wherein the message was sent by the first node subsequent to an initial message sent by the first node to a third node, and an initial reply sent by the third node to the first node, the third node being in the cluster of nodes,
wherein each of the nodes in the cluster stores a cluster wide shared secret, wherein the cluster wide shared secret comprises a private key of the nodes in the cluster,
wherein the initial message sent by the first node includes a sequence number, and wherein the initial reply sent by the third node includes a cryptographic sequence number generated by the third node, the cryptographic sequence number generated by replacing a portion of the sequence number received in the initial message with a fingerprint based on the cluster wide shared secret stored at the third node, wherein the fingerprint is generated using an Internet Protocol (IP) address of the first node, a port of the first node, a port of the second node, an IP address of the second node, and the cluster wide shared secret;

processing the message at the second node to determine that the first node and the third node were involved in a connection setup procedure that has not yet been completed; verifying at the second node that the cryptographic sequence number sent by the first node was created by one of the nodes in the cluster, wherein the verifying comprises accessing the cluster wide shared secret stored at the second third node, and wherein either:

the second node builds a connection between the second node and the first node if the cryptographic sequence number was generated based on the cluster wide shared secret; and the second node determines that the first node was not legitimately attempting to create a connection with the third node if the cryptographic sequence number was not generated based on the cluster wide shared secret.

12. The apparatus according to claim 11, wherein the fingerprint is generated by performing a hash function on the IP address of the first node, the port of the first node, the port of the second node, the IP address of the second node, and the cluster wide shared secret.

13. The apparatus according to claim 11, wherein the initial message comprises a SYN message.

14. The apparatus according to claim 11, wherein the message comprises an Acknowledge message.

15. The method of claim 1, further comprising:
determining that the third node failed after sending the initial reply to the first node.

16. The apparatus according to claim 11, the computing device further configured to perform:
determining that the third node failed after sending the initial reply to the first node.

17. The method of claim 1, further comprising determining that the third node failed after sending the initial reply to the first node but before the message is received at the second node.

18. The system according to claim 9, wherein the second node fails after sending the initial reply to the first node but before the second message is received at the third node.

19. The system according to claim 9, wherein the initial message is a SYN message and the message is an ACK message.

* * * * *

UNITED STATES PATENT AND TRADEMARK OFFICE
CERTIFICATE OF CORRECTION

PATENT NO. : 7,454,614 B2  Page 1 of 1
APPLICATION NO. : 10/103774
DATED : November 18, 2008
INVENTOR(S) : Thomas Kroeger It is certified that error appears in the above-identified patent and that said Letters Patent is hereby corrected as shown below:

On the Title Page of the Patent:

Please replace the patent assignee information with the following information:

Nokia Corporation
Espoo, FI

Signed and Sealed this

Fifth Day of January, 2010

David J. Kappos
*Director of the United States Patent and Trademark Office*